United States Patent [19]

Kobayashi et al.

[11] 4,431,096
[45] Feb. 14, 1984

[54] DIRECT-COUPLING CLUTCH CONTROL SYSTEM FOR AN AUTOMATIC TRANSMISSION

[75] Inventors: Koji Kobayashi, Toyota; Keizo Kobayashi, Anjo, both of Japan

[73] Assignee: Aisin Warner Kabushiki Kaisha, Anjo, Japan

[21] Appl. No.: 227,011

[22] Filed: Jan. 21, 1981

[30] Foreign Application Priority Data

Jan. 22, 1980 [JP]  Japan ................................. 55-5942

[51] Int. Cl.³ ............................................ F16D 33/00
[52] U.S. Cl. ................................ 192/3.31; 192/3.57; 74/731; 74/733
[58] Field of Search ............... 192/3.31, 103 R, 0.033; 74/733, 732, 731

[56] References Cited

U.S. PATENT DOCUMENTS

| | | | |
|---|---|---|---|
| 2,824,631 | 2/1958 | DeLorean | 192/3.31 |
| 2,824,632 | 2/1958 | Lucia | 192/3.31 |
| 3,138,971 | 6/1964 | Fisher | 74/752 C |
| 3,330,170 | 7/1967 | Rains | 74/752 C |
| 3,505,907 | 4/1970 | Fox | 74/732 |
| 3,985,046 | 10/1976 | Morris | 192/3.31 |
| 4,095,486 | 6/1978 | Ohnuma | 74/733 |
| 4,270,636 | 6/1981 | Sunohara | 192/3.31 |
| 4,289,048 | 9/1981 | Mikel | 74/733 |
| 4,294,140 | 10/1981 | Iwanaga | 192/3.31 |

FOREIGN PATENT DOCUMENTS 52-39066  3/1977  Japan ................................. 192/3.31

Primary Examiner—Allan D. Herrmann
Assistant Examiner—D. Wright
Attorney, Agent, or Firm—Blum, Kaplan, Friedman, Silberman & Beran

[57] ABSTRACT

The automatic transmission comprises a torque converter having a pump, a turbine, a stator and a direct-coupling clutch adapted to engage the pump with the transmission casing, and a transmission gear having multiple forward gears and a reverse gear. A lockup control valve comprising a spool on which a governor pressure and the force of a spring act oppositely, and a switch valve adapted to change-over the oil-hydraulic circuits for the release or the engagement of the direct-coupling clutch, are provided for the oil-hydraulic control circuit of the automatic transmission. The direct-coupling clutch can become engaged only if the governor pressure should exceed a predetermined pressure and the transmission be in a select high speed range.

3 Claims, 2 Drawing Figures

DIRECT-COUPLING CLUTCH CONTROL SYSTEM FOR AN AUTOMATIC TRANSMISSION

BACKGROUND OF THE INVENTION

This invention relates generally to an automatic transmission and more particularly to a controller for a direct coupling clutch. In an automatic transmission equipped with a torque converter comprising a pump, a turbine and a stator, it is known to economize on fuel by directly connecting the pump to the output shaft of the turbine by means of a direct-coupling clutch. This is done when the automatic transmission is shifted to the high speed range in order to improve the efficiency of power transmission. In this transmission comprising a direct-coupling clutch, when the direct-coupling clutch is engaged, frequently while the automatic transmission has shifted to a range other than the high speed range, overheating of the working fluid of the torque converter, or engine stall is liable to occur. Accordingly, highly reliable performance of the direct-coupling clutch operating circuit is essential to the automatic transmission.

What is needed is an automatic transmission which is automatically, directly or indirectly, coupled to satisfy operating conditions of the vehicle and protect the transmission and torque converter.

SUMMARY OF THE INVENTION

Generally speaking, in accordance with the invention, a clutch control system especially suitable for protecting an automatic transmission and torque converter, is provided. This invention relates to a system for an automatic transmission equipped with a torque converter with a direct-coupling clutch. The direct-coupling clutch is allowed to be engaged only when two conditions are satisfied. Namely, the automatic transmission has shifted to the high speed range which is suitable for engagement of the direct-coupling clutch, and also the rotational speed of the output shaft of the automatic transmission exceeds a predetermined rotating speed. The direct-coupling clutch is maintained in the released state while either one of the above conditions is not satisfied. In accordance with the present invention, the oil-hydraulic control circuit of the automatic transmission includes an oil pressure source or pump and a switch valve for selective change-over between a direct-coupling clutch engaging oil-hydraulic passage and a direct-coupling clutch releasing oil-hydraulic passage. The oil-hydraulic control circuit also includes a lockup control valve which actuates the switch valve so that the direct-coupling clutch is caused to engage. When a governor pressure exceeds a predetermined valve, a valve element of the lockup control valve is shifted by the governor pressure applied to the lockup control valve so that oil pressure is applied to make the switch valve function. However, when the automatic transmission is not shifted into the high speed range which is suitable for engaging the direct-coupling clutch, a counter oil pressure is applied to the lockup control valve. This counter pressure works against the governor pressure to retain the valve element of the lockup control valve at a position so as not to allow the engagement of the direct-coupling clutch, thus maintaining the direct-coupling clutch in a released state.

More particularly, the automatic transmission comprises a torque converter having a pump, a turbine, a stator and a direct-coupling clutch adapted to engage the pump with the transmission casing, and a transmission gear having multiple forward gears and a reverse gear. A lockup control valve comprising a spool on which a governor pressure and the force of a spring act oppositely, and a switch valve adapted to change-over the oil-hydraulic circuits for the release or the engagement of the direct-coupling clutch are provided for the oil-hydraulic control circuit of the automatic transmission. Normally, the spool of the switch valve is retained, at a position to make the direct-coupling clutch release, by the line pressure and the spring force. The spool of the lockup control valve is retained at an upper position by a spring force while the governor pressure is below a predetermined pressure so that the spool of the switch valve will not be operated. When the transmission is shifted to a select range, suitable for actuating the direct-coupling clutch, and the governor pressure is above the predetermined pressure, the spool of the lockup control valve is shifted to a lower position by the governor pressure, which allows the line pressure to be applied to the bottom end of the spool of the switch valve to shift the spool to the upper position, so that the direct-coupling clutch is engaged. When the automatic transmission is shifted to ranges other than the said select range, the line pressure is applied to the bottom end of the spool of the lockup control valve to retain the spool at the upper position. Consequently, the direct-coupling clutch cannot become engaged if the governor pressure should even exceed the predetermined pressure.

Accordingly, it is an object of this invention to provide an improved automatic transmission with a direct-coupling clutch which prevents wrong operation of the direct-coupling clutch, and ensures reliable operation of the direct-coupling clutch.

Another object of the present invention is to provide an improved automatic transmission which prevents erroneous operation of the direct-coupling clutch by keeping a lockup control valve in a state which does not allow engagement of the direct-coupling clutch when the automatic transmission has not shifted to a high speed range which is suitable for engagement of the direct-coupling clutch.

A further object of the present invention is to provide an improved automatic transmission which certainly engages the direct-coupling clutch when the automatic transmission is shifted to the high speed range, which is suitable for engaging the direct-coupling clutch, and the governor pressure is higher than a predetermined pressure.

A still further object of this invention is to provide an improved automatic transmission which surely keeps the direct-coupling clutch released in conditions other than the conditions as described above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
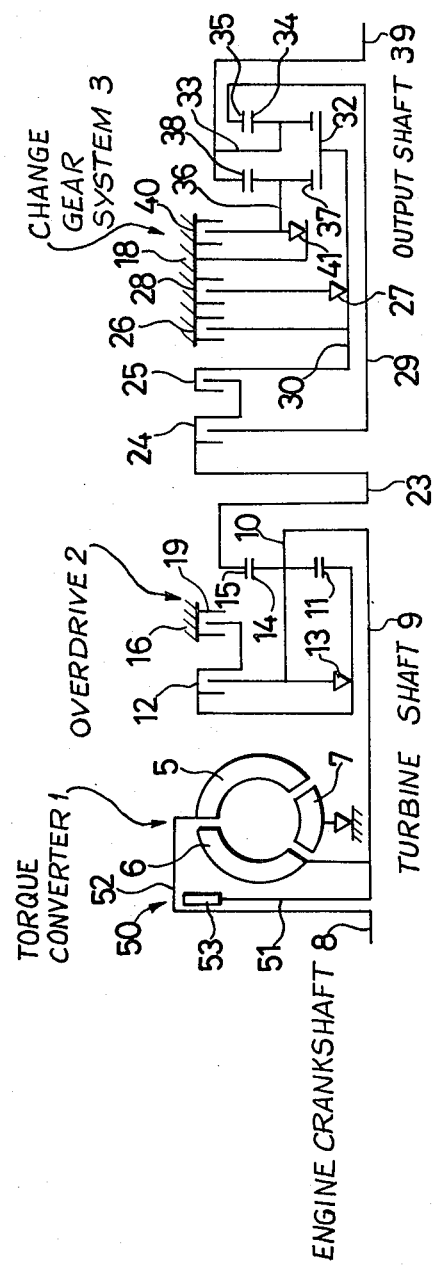
FIG. 1 is a diagrammatic illustration of a power transmitting mechanism of an automatic transmission including a direct-coupling clutch control system in accordance with the present invention.
Figure 2:
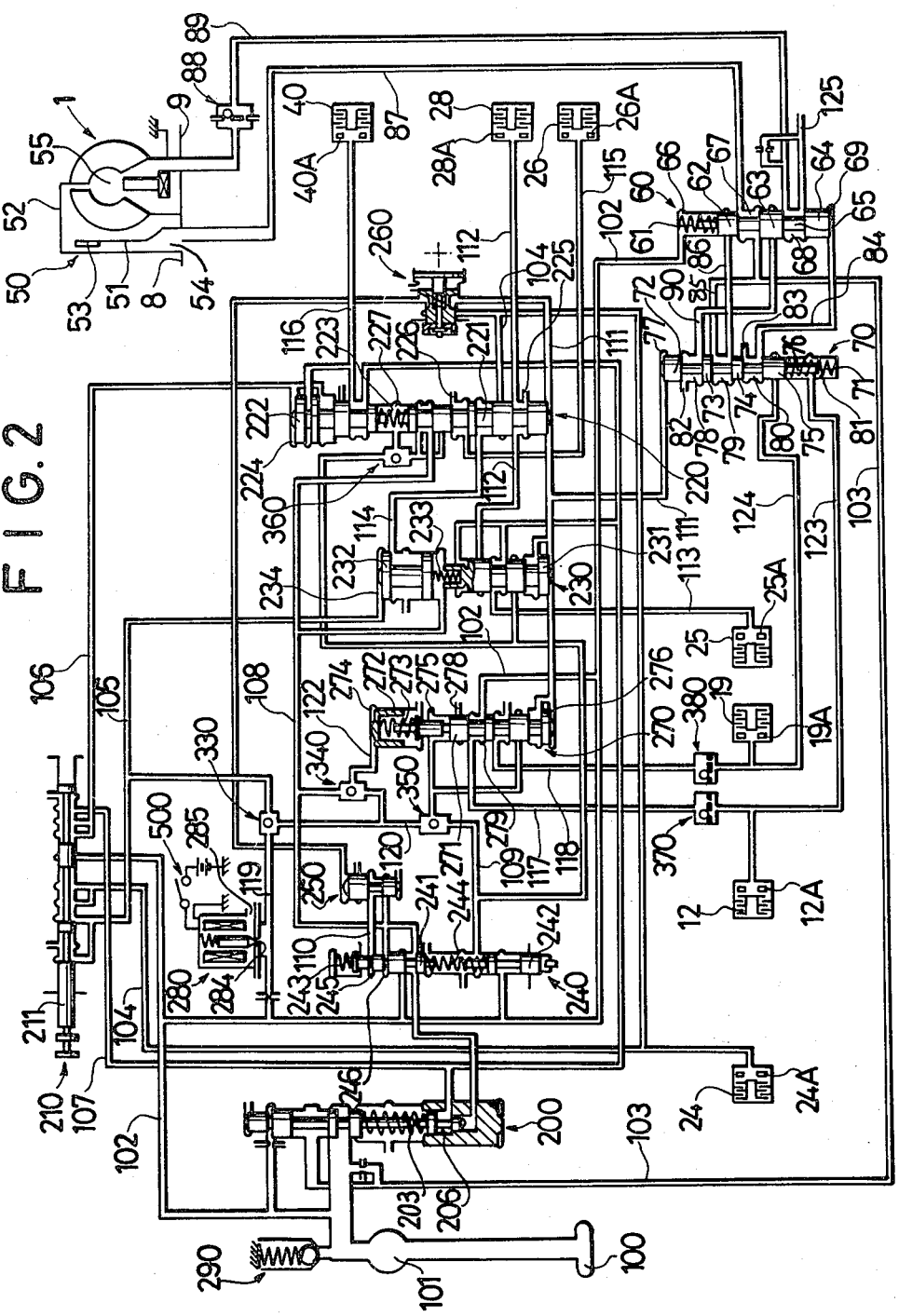
FIG. 2 is a schematic of an oil-hydraulic circuit of an automatic transmission including the direct-coupling clutch control system in accordance with the present invention.

An exemplary automatic transmission equipped with the direct-coupling clutch control system in accordance with the present invention is described referring to FIGS. 1 and 2. This automatic transmission comprises a torque converter 1 furnished with a direct-coupling clutch, an over-drive mechanism 2 and a change gear system 3 having three forward gears and one reverse gear. The torque converter 1 is of a known type comprising a pump 5, a turbine 6 and a stator 7. The pump 5 and the turbine 6 are connected to the crank shaft 8 of the engine and a turbine shaft 9 respectively. The turbine shaft 9 functions as the output shaft of the torque converter 1 as well as the input shaft of the overdrive mechanism 2. A carrier 10 of a planetary gear is connected to the turbine shaft 9. A direct-coupling clutch 50 is interposed between the crank shaft 8 of the engine and the turbine shaft 9 to mechanically connect the crank shaft 8 of the engine and the turbine shaft 9 when the direct-coupling clutch 50 is engaged. A planetary pinion 14 rotatably supported on the carrier 10 is engaged with a sun gear 11 and a ring gear 15. A multiple disk clutch 12 and a one-way clutch 13 are provided between the sun gear 11 and the carrier 10, while a multiple disk brake 19 is provided between the sun gear 11 and an over-drive case 16 housing the over-drive mechanism. The ring gear 15 of the over-drive mechanism 2 is connected to the input shaft 23 of the change gear system 3. An multiple disk clutch 24 is interposed between the input shaft 23 and an intermediate shaft 29, while a multiple disk clutch 25 is interposed between the input shaft 23 and a sun gear shaft 30. A multiple disk brake 28 is interposed between the sun gear shaft 30 and the transmission case 18 through a multiple disk brake 26 and a one-way clutch 27. A sun gear 32 is provided on the sun gear shaft 30 for two sets of planetary gear mechanisms together with a carrier 33, a planetary pinion 34 carried on the carrier 33, a ring gear 35 engaged with the planetary pinion 34, another carrier 36, a planetary pinion 37 carried on the carrier 36, and a ring gear 38 engaged with the planetary pinion 37. The ring gear 35 of one set of planetary gear mechanisms is connected to the intermediate shaft 29. The carrier 33 of the planetary gear mechanism is connected to the ring gear 38 of the other set of planetary gear mechanisms and also to an output shaft 39. A multiple disk brake 40 and a one-way clutch 41 are interposed between the carrier 36 and the transmission case 18.

An oil pressure controller detailed hereunder is adapted to control the fluid type automatic transmission with an over-drive mechanism as hereinbefore described by engaging or releasing the respective clutches or the brakes according to the vehicle speed bringing about speed change operations in the four forward ranges including the over-drive range and, by manual shifting in the reverse range.

Table 1 shows the operating condition of the clutches and the brakes relative to the position of the change gear. In Table 1, symbols ○ designate that the clutches or the brakes are in an engaged state, and X indicates that the clutches or the brakes are in a released state. CL indicates clutch; BR indicates brake, OC indicates one-way clutch. Lk indicates that the one-way clutches are in a locked state, and OR indicates that the one-way clutches are in an over-running state.

TABLE 1

| Shift position | | | CL 12 | CL 24 | CL 25 | BR 19 | BR 26 | BR 28 | BR 40 | OC 13 | OC 27 | OC 41 |
|---|---|---|---|---|---|---|---|---|---|---|---|---|
| Parking | | | ○ | X | X | X | X | X | ○ | | | |
| Reverse | | | ○ | X | ○ | X | X | X | ○ | LK | OR | LK |
| Nutral | | | ○ | X | X | X | X | X | X | | | |
| Forward | D-Range | 1st | ○ | ○ | X | X | X | X | X | LK | LK | LK |
| | | 2nd | ○ | ○ | X | X | X | ○ | X | LK | LK | OR |
| | | 3rd | ○ | ○ | ○ | X | X | ○ | X | LK | OR | OR |
| | | O.D.(4th) | X | ○ | ○ | ○ | X | ○ | X | OR | OR | OR |
| | 2-Range | 1st | ○ | ○ | X | X | X | X | X | LK | LK | LK |
| | | 2nd | ○ | ○ | X | X | ○ | ○ | X | LK | LK | OR |
| L-Range | | | ○ | ○ | X | X | X | X | ○ | LK | LK | LK |

Referring now to FIG. 2, the oil-hydraulic control circuit comprises an oil reservoir 100, an oil pump 101, a pressure regulating valve 200, a range selecting valve 210, a 1-2 shift valve 220, a 2-3 shift valve 230, a throttle valve 240, a cut-back valve 250, a governor valve 260, and over-drive shift valve 270, a solenoid valve 280, a relief valve 290, a switch valve 60 and a lockup control valve 70 of this invention. The control circuit also comprises check valves 330, 340, 350, 360, 370, 380, 88 each having an orifice and a check ball, clutches 12, 24, 25, oil-hydraulic cylinders 12A, 24A, 25A, 19A, 26A, 28A, 40A, working as oil-hydraulic chambers for the oil-hydraulic pistons of oil-hydraulic servo-mechanism for operating clutches 12, 24, 25 and brakes 19, 26, 28, 40 respectively, and oil-hydraulic passages connecting the respective valves and oil-hydraulic cylinders. Operation of this oil-hydraulic control circuit is described hereinafter.

The oil pump 101 applies a working pressure to the oil-hydraulic control circuit and also supplies a working fluid to the torque converter 1 and lubricating oil to various parts of the mechanism. The oil pump 101 is directly driven by the engine and adapted to pump up the oil from an oil reservoir 100 and deliver oil to a line 102. The oil pressure in the passage 102 is the source of all working pressure, therefore, the oil pressure in the passage 102 is designated as line pressure. The line pressure is regulated to a predetermined pressure level as hereinafter described by the pressure regulating valve 200. The relief valve 290 relieves the line pressure when the line pressure becomes excessively high. Oil is supplied to the torque converter 1 and various lubricating parts by way of a passage 103 through the pressure regulating valve 200. The range selecting valve 210 comprising a spool 211, introduces the line pressure of the passage 102 to the passages 104, 105, 106 or 107 as shown in Table 2 corresponding to the shift position of the shift lever provided for the driver's cab for manual operation.

TABLE 2

| Shift position | Line 104 | Line 105 | Line 106 | Line 107 |
|---|---|---|---|---|
| R | — | — | O | O |
| N | — | — | — | — |
| D | O | — | — | — |
| 2 | O | O | — | — |
| L | O | O | O | — |

In Table 2, the symbols "O" and "-" designate that the line pressure is applied to, and cut off from the particular passages respectively corresponding to the shift position of the shift lever. The symbols of the shift position are represented; N is the Neutral position; D is the Forward four-speed automatic transmission range; 2 is the Forward 1st and 2nd speed automatic transmission range, and L is the Forward low-speed locked range. R is the Reverse speed range.

With the range selecting valve 210 at D-position, the line pressure is applied to the oil-hydraulic cylinder 24A through the paassage 104 so that the clutch 24 is continuously engaged. With the range selecting valve 210 at D and in the 1st,2nd and 3rd forward position, the clutch 12 is engaged, which will be described hereinafter. The line pressure is applied to the 1-2 shift valve 220 and the governor valve 260 through the passage 104. The 1-2 shift valve 220 comprises spools 221,222, and a spring 223. In the 1st speed range, the spool 221 is located at the lower position as illustrated in the drawing, interrupting the working fluid of the passage 104. As the vehicle speed increases to 2nd speed, 3rd speed and 4th speed, the governor pressure applied to the 1-2 shift valve 220 through the passage 111 increases according to the vehicle speed increase and finally the spool 221 is shifted upward so that the passages 104 and 112 are connected. The passage 112 communicates with the 2-3 shift valve 230 as well as with the oil-hydraulic cylinder 28A of the brake 28 so that the line pressure is applied to the oil-hydraulic cylinder 28A to make the brake 28 function. When the brake 28 functions, the transmission is in the 2nd range condition as shown in Table 1.

The 2-3 shift valve 230 comprises spools 231, 232, and a spring 233. In the 1st and 2nd speed ranges, the spool 231 is located at the lower position as illustrated in the drawing. As the vehicle speed increases to 3rd speed and 4th speed, the governor pressure applied to the shift valve 230 through the passage 111 increases and finally the spool 231 is shifted upward to allow the pressurized oil in the passage 112 enter into the passage 113 which supplies the pressurized oil to the oil-hydraulic cylinder 25A of the clutch 25 so that the clutch 25 is operated. When the clutch 25 is engaged, the transmission changes into the 3rd speed condition as shown in Table 1.

The over-drive shift valve 270 comprises a spool 271, a sleeve 272, a spring 273, oil chambers 274, 275, 276. The connection of the passage 102 to the passage 117 or the passage 118 is slectively switched corresponding to the oil pressure working on the oil chambers 274, 275, and 276. The solenoid valve 280 is controlled by an over-drive selecting switch 500 provided in the driver's cab for manual operation. With the over-drive selecting switch 500 at the OFF-position, the armature of the solenoid valve 280 closes an orifice 284. Then pressurized oil, supplied through the passage 102, is introduced into the oil chamber 274 of the over-drive shift valve 270 through the passage 119, the check valve 330, the passage 120, the check valve 340 and the passage 122. Consequently, the spool 271 and the sleeve 272 are retained at the lower position as illustrated in the drawing. With the over-drive selecting switch 500 at the ON-position, the armature of the solenoid valve 280 opens the orifice 284. Then the pressurized oil in the oil chamber 274 is drained through the passage 122, the check valve 340, the passage 120, the check valve 330, the passage 119 and the orifice 284 of the solenoid 280 from a drain port 285. The throttle pressure is applied to the oil chamber 274 through the passage 108, the check valve 340 and the passage 122, while the governor pressure is applied to the oil chamber 276 through the passage 111. The spool 271 is controlled corresponding to the relative magnitude between the throttle pressure and the governor pressure.

With the over-drive selecting switch 500 at the OFF-position, the line pressure of the passage 102 is applied to the oil chamber 274 of the over-drive shift valve 270 as hereinbefore described. Therefore, the spool 271 and the sleeve 272 are retained at the lower position as illustrated in the drawing, allowing the pressurized oil in the passage 102 to be introduced into the oil-hydraulic cylinder 12A of the clutch 12 through the oil chamber of the over-drive shift valve 270, the passage 117 and the check valve 370, so that the clutch 12 is engaged and the 3rd speed condition is maintained.

With the over-drive selecting switch 500 at the ON-position, the throttle pressure is applied to the oil chamber 274 of the over-drive shift valve 270 through the passage 108 as hereinbefore described. The spool 271 of the over-drive shift valve 270 is controlled by the throttle pressure and the governor pressure applied to the oil chamber 274 and the oil chamber 276 respectively. Under the 1st speed, 2nd speed and 3rd speed conditions while the governor pressure remains low, the spool 271 is retained at the lower position as illustrated in the drawing, allowing the pressurized oil in the passage 102 to be introduced into the oil-hydraulic cylinder 12A through an oil chamber of the over-drive shift valve, the passage 117 and the check valve 370 so that the clutch 12 is engaged. When the spool 271 is shifted upward with the increase in the governor pressure, the passage 117 communicates with a drain port 278 so that the clutch 12 is released, while the pressurized oil in the passage 102 is introduced into the oil-hydraulic cylinder 19A of the brake 19 through the oil chamber of the over-drive shift valve 270, the passage 118 and the check valve 380 to make the brake 19 function. Thereby, the tranmission is shifted to the 4th speed condition, the over-drive condition.

With the range selecting valve 210 at the 2-position, the line pressure is applied to the passages 104 and 105. The pressurized oil introduced into the line 105 enters into the oil chamber 234 of the 2-3 shift valve 230 so that the spools 231, 232 are retained at the lower position as illustrated in the drawing. The pressurized oil introduced into the passage 105 is supplied also to the oil chamber 274 of the over-drive shift valve 270 through the check valve 330, the passage 120, the check valve 340 and the passage 122 so that the spool 271 and the sleeve 272 are at the lower positions as illustrated in the drawing.

The pressurized oil, introduced into the passage 104, is supplied to the oil-hydraulic cylinder 24A of the clutch 24 and the 1-2 shift valve 220. When the 1-2 shift valve 220 is raised to the upper position by the governor pressure, the pressurized oil in the passage 104 is supplied to the oil-hydraulic cylinder 28A through the passage 112 to make the brake 28 function. Concurrently, the pressurized oil in the passage 105 is supplied to the oil-hydraulic cylinder 26A of the brake 26 through the 2-3 shift valve 230, the passage 114, the 1-2 shift valve 220 and the passage 115 to make the brake 26 function. With the clutches 24, 12 and the brakes 26, 28 functioning, the transmission is shifted to the 2nd speed condition as shown in Table 1. When the vehicle speed is reduced and the governor pressure working in the passage 111 becomes lower than the throttle pressure working on the head of the spool 221 through the check valve 360, the spool 221 is shifted downward. This allows the line 112 to communicate with the drain port 225 so that the pressurized oil in the oil-hydraulic cylinder 28A is drained through the passage 112 and the drain port 225 and the brake 28 is released. At the same time, the passage 115 is allowed to communicate with the drain port 226 so that the pressurized oil in the oil-hydraulic cylinder 26A is drained from the drain port 226 and the brake 26 is released. Then the transmission is shifted to the 1st speed condition.

With the range selecting valve 210 at the L-position, the line pressure is introduced into the passages 104, 105 and 106. Pressurized oil introduced into the passage 104 makes the clutch 24 engage in the same manner as performed in the respective ranges of the D-position. The pressurized oil introduced into the passage 105 is supplied to the oil chamber 234 to retain the spools 231 and 232 of the 2-3 shift valve 230 at the lower position, and also to retain the spool 271 and the sleeve 272 of the over-drive shift valve 270 at the lower position as hereinbefore described. The pressurized oil introduced in the passage 106 is supplied to the oil chamber 224 of the 1-2 shift valve 220 to retain the spools 221 and 222 at the lower position, and is simultaneously supplied to the oil-hydraulic cylinder 40A of the brake 40 through the passage 116 to make the brake 40 function. When the clutches 24, 12 and the brake 40 are thus made to function, the transmission is shifted to the 1st speed condition as shown in Table 1.

With the range selecting valve at the R-position, line pressure is introduced into the passages 106 and 107. The pressurized oil introduced into the passage 107 is supplied to the oil chamber 206 of the pressure regulating valve 200 and works to raise the line pressure. The pressurized oil is supplied also to the passage 113 through the 2-3 shift valve 230 to make the clutch 25 engage. The pressurized oil in the passage 107 is supplied also to the passage 116 through the 1-2 shift valve 220 to make the brake 40 function. With the spool 231 of the 2-3 shift valve 230 and the spool 271 of the over-drive shift valve 270 being retained at the lower positions in the drawing, the clutch 25 is made to function through the passage 107, the 203 shift valve and the passage 113, and the clutch 12 is made to function through passage 102, the over-drive shift valve 270 and the passage 117. When the clutches 25 and 12 and the brake 40 are thus made to function, the transmission is shifted to the reverse range.

The governor valve 260 is mounted on the output shaft 39 shown in FIG. 1. The governor valve 260 generates, therefore, a pressure related generally to the speed of the vehicle having this engine/transmission, and more precisely, the governor valve 260 generates a pressure as a function of the rotation of the output shaft, i.e. an oil pressure (governor pressure) which rises in accordance with the increase in the rotational speed of the output shaft, on the basis of a balance between the centrifugal force, a spring force and the oil pressure.

The throttle valve 240 comprises a spool 241, a down-shift plug 242, springs 243, 244 and oil chambers 245, 246. The throttle valve 240 is adapted to generate a throttle pressure passage in proportion to the throttle opening on the basis of a balance between the force of the spring 244, dependent on the movement of the down-shift plug 242 interlocking with the movement of the accelerator pedal, and oil pressures working on the oil chambers 245, 246. The throttle pressure of the passage 108 is applied to the heads of the spools 221, 231, 271 of the 1-2 shift valve 220, the 2-3 shift valve 230 and the over-drive shift valve 270, respectively, to push the spools 221, 231, 271 downward, thus controlling the timing of range change depending on the condition of the engine load.

When a kick-down operation is required, the down-shift plug 242 is shifted upward by kicking-down the accelerator pedal to allow the passage 102 to communicate with the passage 109 so that line pressure is applied to the 1-2 shift valve 220 and the 2-3 shift valve 230 through the passage 109 and to the over-drive shift valve 270 through the check valve 350. This causes a shift-down operation from the 4th speed to the 3rd speed, from the 3rd speed to the 2nd speed or from the 2nd speed to the 1st speed depending on the relationship to the governor pressure working on the bottom ends of the spools 221, 231, 271.

The cut-back valve 250 generates a cut-back pressure in the passage 110 on the basis of a balance of the pressurized oil. The cut-back pressure of the passage 110 works on the throttle valve 240 to reduce the throttle pressure so that an unnecessary power loss of the oil pump is prevented.

The pressure regulating valve 200 generates the line pressure in the passage 102 on the basis of a balance of the pressure of oil and the force of the spring 203.

Each of the check valves 370, 380, 88 comprises a check ball, an orifice and ports.

The direct-coupling clutch control system of the present invention will be described hereinafter referring to the drawings illustrating an embodiment of the present invention. The essential components of the present invention are a torque converter 1 of a fluid-type automatic transmission, a pump impeller 5 connected to the crank shaft 8 of the engine, a turbine 6, a stator 7, a torque converter direct-coupling 50 for directly coupling the crank shaft 8 of the engine and the turbine shaft 9, and a switch valve 60 and a lockup control valve 70.

The clutch disk 51 of the direct-coupling clutch 50 is mounted slidably in the axial direction on the turbine shaft 9 or the base of the turbine 6 with a small gap between the periphery of the clutch disk 51 and the casing 52 of the torque converter 1, a casing which connects the crank shaft 8 of the engine and the pump 5. A clutch facing member 53 is fixed to the clutch disk 51. The clutch facing element 53 is maintained separated from the casing 52 while the pressurized oil is supplied through the direct-coupling release passage 87 to an oil chamber 54 provided between the casing 52 of the torque converter 1 and the clutch disk 51 to keep the direct-coupling clutch 50 released. The clutch disk 51 is pressed against the casing 52 by the oil pressure applied to the working chamber 55 of the torque converter 1 through the direct-coupling clutch engaging passage 89 when the pressurized oil in the oil chamber 54 is drained through the direct-coupling clutch releasing passage 87 so that the casing 52 of the torque converter 1 and the turbine shaft 9 are directly connected by the direct-coupling clutch 50.

In this embodiment, the switch valve 60 comprises a spring 61 located at the upper part of the valve proper, a spool 65 having lands 62, 63 and 64 formed at the upper part, middle part and lower part, respectively, of the spool 65. An upper oil chamber 66 is formed so as to allow the line pressure of the oil pressure source, transmitted through the passage 102, to work on the land 62. The switch valve 60 also comprises an oil chamber 67 formed between the lands 62, 63, an oil chamber 68 formed between the lands 63, 64, and a bottom oil chamber 69. The oil chamber 67 always communicates with the direct-coupling clutch releasing passage 87. The oil chamber 67 communicates with the oil chamber 79 of the lockup valve 70 through a passage 86 while the spool 65 is at the upper position. The oil chamber 67 communicates with the passage 103, through which the pressurized oil is supplied from the pressure source to the torque converter 1, while the spool 65 is at the lower position. The oil chamber 68 always communicates with the direct-coupling clutch engaging passage 89 and also communicates with the oil chamber 78 of the lockup control valve through a passage 90 while the spool 65 is at the upper position. The oil chamber 68 communicates with a working fluid cooler, not shown, through a passage 125 while the spool 65 is at the lower position. The bottom oil chamber 69 communicates with an oil-hydraulic servomechanism of the oil-hydraulic control circuit to which an oil pressure is applied through the lockup control valve 70 and the passage 84, in a running condition requiring the engagement of the direct-coupling clutch, for instance, constant rate high-speed running with the over-drive gear.

The lockup control valve 70 comprises a spring 71 disposed at the lower part of the valve proper, a spool 76 provided with four lands 72, 73, 74, 75, a top oil chamber 77 formed above the land 72, an oil chamber 78 formed between the lands 72 and 73, an oil chamber 79 formed between the lands 73 and 74, an oil chamber 80 formed between the lands 74 and 75 and a bottom oil chamber 81 formed under the land 75. The governor pressure which works on the land 72 is applied to the top oil chamber 77 through a passage 111. The oil chamber 78 always communicates with a passage 90, at the same time, makes the passage 90 communicate with a drain port 82 while the spool 76 is retained at the upper position and makes the passage 90 communicate with the passage 103 while the spool 76 is retained at the lower position. The oil chamber 79, always communicating with a passage 86, makes the passage 86 connect with the passage 103 or with the drain port 83 while the spool 76 is retained at the upper position or at the lower position respectively. The oil chamber 80, always communicating with a passage 84, makes the passage 84 connect with the drain port 83 while the spool 76 is retained at the upper position or with the oil-hydraulic servomechanism 19A through a line 124 while the spool 76 is retained at the lower position. The servomechanism 19A is a portion of a frictional coupling device included in the oil-hydraulic control circuuit of the control system which operates when the transmission is in the state that the direct-coupling clutch 50 is to be engaged. The bottom oil chamber 81 always communicates through a passage 123 with the oil-hydraulic servomechanism 12A of a frictional coupling device adapted to operate when the transmission is in the state that the direct-coupling clutch is to be released.

In operation, with the automatic transmission operating in the 1st, 2nd and 3rd speed ranges, line pressure is applied to the oil-hydraulic cylinder 12A so that the line pressure is applied to the bottom oil chamber 81 of the lockup control valve 70 through the passage 123 to securely retain the spool 76 at the upper position as shown in the drawing (FIG. 2). The spool 65 is retained at the lower position as the land 75 of the spool 76 is interrupting the connection between the passages 124 and 84 and no pressurized oil is supplied to the bottom oil chamber 69 of the switch valve 60. Pressurized oil is supplied to the torque converter 1 through the passage 103, the oil chamber 67 of the switch valve 60 and the passage 87. At this time, the direct-coupling clutch 50 remains released.

With the automatic transmission shifted to the 4th range, the spool 271 of the over-drive shift valve 270 is shifted to the upper position. Then pressurized oil in the oil-hydraulic cylinder 12A is drained through the port 278 and line pressure is applied to the oil-hydraulic cylinder 19A through the passage 102, the over-drive shift valve 270 and the passage 118.

The lockup control valve 70 is provided for the purpose of making the switch valve 60 function and thereby allow engagement of the direct-coupling clutch 50 when two conditions are satisfied. That is, firstly the automatic transmission is shifted into a speed range in which the direct-coupling clutch is to be engaged, and secondly, the vehicle speed is higher than a preselected value. On the other hand, the switch valve 60 functions to retain the direct-coupling clutch 50 in a released state when either one of said conditions is not satisfied.

As hereinbefore described, the governor generates oil pressure in the passage 111 as a function of the rotational speed of the output shaft 39. In setting the magnitude of resilience of the spring 71 acting on the bottom end of the spool 76 and urging the spool 76 upward, first, the governor pressure corresponding to said preselected vehicle speed is determined. Then the spring 71 is adjusted so that the force applied upwardly to the bottom end of spool 76 is balanced against the force produced when the governor pressure, corresponding to the preselected vehicle speed, is applied to the oil chamber 77 of the lockup control valve 70 to urge the spool 76 downward. In this embodiment, the 4th speed range (overdrive range) is the range in which the direct-coupling clutch 50 is engaged. The oil-hydraulic cylinder 12A of the clutch 12 and the oil chamber 81 of the lockup control valve 70 are connected. The line pressure is applied to the oil-hydraulic cylinder 12A while the automatic transmission is shifted to the 1st, 2nd or 3rd speed range, and the line pressure is released when the automatic transmission is shifted to the 4th speed range. Thus, with the automatic transmission shifted to the 4th speed range, the line pressure is not applied to the oil chamber 81 and the spool 76 is retained at the upper position by the force of the spring 71. The upper position closes off the passage 84 connected to the bottom oil chamber 69 of the switch valve 60 because the governor pressure applied to the oil chamber 77 through the passage 111 is lower than the set pressure before the vehicle speed exceeds the preselected speed. Consequently, the spool 65 of the switch valve 60 is retained at the lower position by the force of the spring 61 and the line pressure applied to the top oil chamber 66. Therefore, pressurized oil is introduced into the direct-coupling clutch releasing passage 87 through the passage 103 and the oil chamber 67 of the switch valve 60 and is supplied to the torque converter 1 to keep the direct-coupling clutch 50 released. With the automatic transmission shifted to the speed range, in which the direct-coupling clutch is to be engaged, that is, the 4th speed range in this embodiment, when the vehicle speed exceeds the preselected vehicle speed, the governor pressure applied to the oil chamber 77 of the lockup control valve 70 becomes higher than the predetermined pressure of the spring 71 so that the spool 76 is shifted to the lower position against the force of the spring 71. With the spool 76 shifted to the lower position, the passage 84 communicating with the oil chamber 69 of the switch valve 60 is connected to the passage 124 through the oil chamber 80 of the lockup control valve 70. Then, the line pressure is applied to the oil chamber 69 through the passage 102, the over-drive shift valve 270 and the passage 118. Thereby, the spool 65 of the switch valve 60 is shifted to the upper position against the force of the spring 61. Consequently, pressurized oil is introduced into the direct-coupling clutch engaging passage 89 and supplied to the torque converter 1 through the passage 103, the oil chamber 78 of the lockup control valve 70, the passage 90 and the oil chamber 68 of the switch valve 60. Then, the pressure in the working chamber 55 of the torque converter 1 is gradually raised by the action of the check valve 88 and simultaneously the pressurized oil in the direct-coupling clutch releasing passage 87 is drained so that the clutch disk 51 is shifted to press the clutch facing element 53 against the casing 52 thus engaging the direct-coupling clutch 50.

When the automatic transmission is shifted to speed ranges under the 3rd speed range, in which the clutch 12 is engaged, the pressurized passage 123, communicating with the oil-hydraulic cylinder 12, is connected with the bottom oil chamber 81 of the lockup control valve 70. Thereby, the line pressure applied to the bottom oil chamber 81 of control valve 70 and the force of the spring 71 cooperate to push the spool 76 upward against the reverse force applied by the governor pressure in the passage 111. These forces securely retain the spool 76 at the upper position. Therefore, the direct-coupling clutch 50 cannot be engaged when the automatic transmission is shifted to a range other than the selected high speed range which is made suitable for engaging the direct-coupling clutch 50.

When the governor pressure becomes lower than the preselected pressure as the vehicle speed is reduced below the preselected speed, the governor pressure applied to the oil chamber 77 of the lockup control valve 70 through the passage 111 decreases. Consequently, the spool 76 is retained at the upper position by the spring 71. The spool 65 of the switch valve 60 is retained at the lower position by the action of the spring 61 and the line pressure applied to the oil chamber 66 while no pressure is applied to the oil chamber 69. Accordingly, the pressurized oil is supplied to the torque converter 1 via the passage 103, the oil chamber 67 and the passage 87 whereby the direct-coupling clutch 50 is released.

When the vehicle speed is increased above the preselected speed and the automatic transmission is shifted to the range where the direct-coupling clutch is to be engaged, the governor pressure is higher than the preselected pressure so that the spool 76 of the lockup control valve 70 is caused to shift to the lower position by the governor pressure applied to the oil chamber 77 of the lockup control valve 70. Thus, the spool 65 of the switch vlave 60 is caused to shift to the upper position by the pressurized oil supplied to the oil chamber 69 via the passage 124, the oil chamber 80 and the passage 84. Consequently, the pressurized oil is supplied to the torque converter 1 via the passage 103, the passage 85, the oil chamber 78, the passage 90, the oil chamber 68 and the passage 89. Thereby the direct-coupling clutch 50 is engaged.

It is apparent from the above description that the direct-coupling clutch control system for an automatic transmission according to the present invention is capable of reliably controlling engagement and release of the direct-coupling clutch.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a hydraulic control system for an automatic transmission comprising plural forward range gears and a single reverse gear and equipped with a torque converter coupled with a direct-coupling clutch, the improvement therein comprising a direct-coupling clutch control system for the automatic transmission including:
a source of pressurized fluid;
a direct-coupling clutch engaging passage connected to said clutch, said direct-coupling clutch being engaged when fluid in said engaging passage is pressurized,
a direct-coupling clutch releasing passage connected to said clutch, said direct-coupling clutch being released when fluid in said releasing passage is pressurized;
a switch valve comprising a valve element being axially shiftable between first and second positions for selectively connecting said source of pressurized fluid to either said direct-coupling clutch releasing passage or to said direct-coupling clutch engaging passage, respectively, a first fluid chamber being located at one end of said valve element to which a line pressure from said source of pressurized fluid is applied for retaining said valve element in said first position, a spring member provided in said first fluid chamber applying a spring force to said one end of said valve element in the same direction with that of the force applied by said line pressure prevailing in said first fluid chamber for retaining said valve element in said first position for connecting said direct-coupling clutch releasing passage to said source of pressurized fluid, in all forward and reverse speed ranges other than the highest speed range, and when said automatic transmission is inoperative, and a second fluid chamber being located at the other end of said valve element to which a line pressure from said source of pressurized fluid is applied for retaining said valve element in said second position against a force acting on said valve element by the line pressure prevailing in said first fluid chamber and the spring force of said spring member; and a lockup control valve comprising a valve element being axially shiftable between first and second positions, a first fluid chamber being located at one end of said valve element and communicating with a passage to which is applied a governor pressure which is derived from and varying in accordance with the vehicle speed, a second fluid chamber being located at the other end of said valve element to which a line pressure from said source of pressurized fluid is applied while said automatic transmission is shifted in the lower speed ranges other than a high speed range, for retaining said valve element of said lockup control valve in said first position, a spring member provided in said second fluid chamber capable of applying a spring force to said other end of said valve element in the direction opposite to that of the force applied by said governor pressure, and a third fluid chamber for allowing communication between a passage to which a pressurized fluid from said source of pressurized fluid is applied, and said second fluid chamber of said switch valve while said valve element of said lockup control valve is positioned in said second position, said valve element of said lockup control valve being positioned in said second position so as to shift said valve element of said switch valve to said second position thereof for connecting said source of pressurized fluid to said direct-coupling clutch engaging passage when said governor pressure exceeds a selected pressure, and in said first position so as to shift said valve element of said switch valve in said first position thereof for connecting said source to said direct-coupling clutch releasing passage when said governor pressure is less than said selected pressure while said automatic transmission is shifted in said high speed range.

2. A direct-coupling clutch control system as claimed in claim 1, wherein said spring force applied to one end of said valve element of said lockup control valve is equivalent to the force applied by said governor pressure at the other end thereof when said governor pressure is equal to a preselected pressure, whereby said direct-coupling clutch is actuated at a preselected speed corresponding to said preselected pressure.

3. A direct-coupling clutch control system as claimed in claim 1, wherein said switch valve includes a first fluid chamber being located at one axial end of said valve element to which a line pressure from said source of pressurized fluid is applied, a spring member provided in said first fluid chamber capable of applying a spring force to one end of said valve element in the axial direction thereof together with the force applied by said line pressure, a second fluid chamber being located at the other end of said valve element and being connected to the output of said third fluid chamber of said lockup control valve for receiving a pressurized fluid from said source through said lockup control valve, capable of applying the force of said pressurized fluid in the axially opposite direction to said spring force whereby said valve element is shifted to said second position when said pressurized fluid is supplied in said second fluid chamber, a third fluid chamber connecting said direct-coupling clutch releasing passage with said source of pressurized fluid when said valve member is positioned in said first position, and a fourth fluid chamber connecting said direct-coupling engaging passage with said source of pressurized fluid when said valve element is positioned in said second position.

* * * * *